Dec. 6, 1966   W. A. PETRIE ETAL   3,289,626
CHAIN STOPPERS
Filed Aug. 19, 1965   2 Sheets-Sheet 1
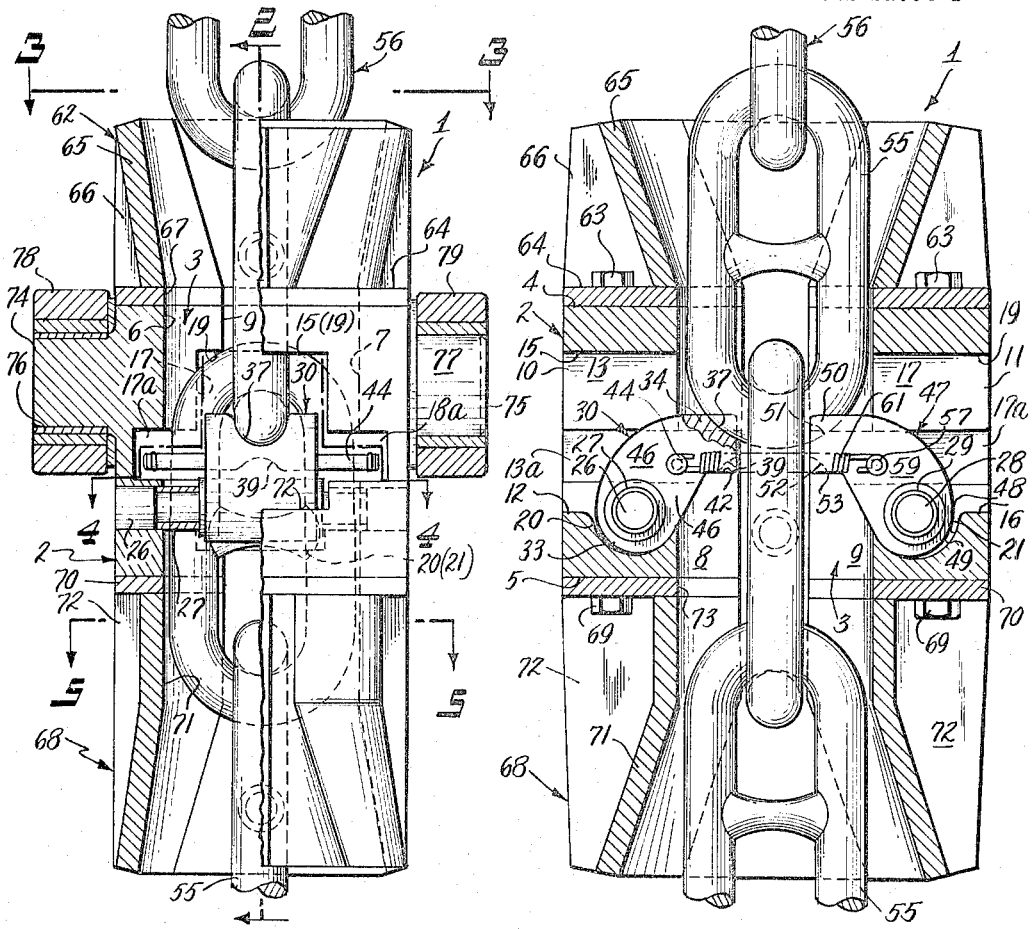
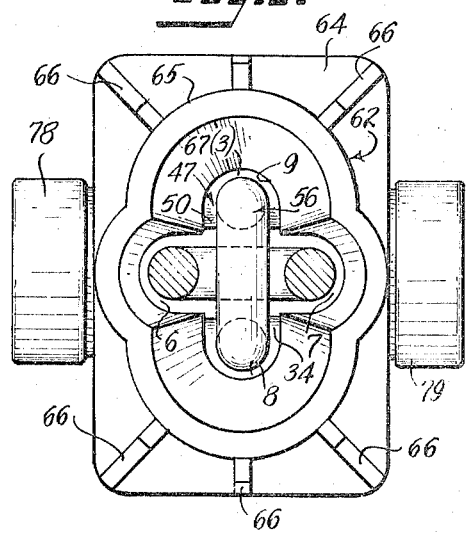
INVENTORS
*Warren A. Petrie*
*George K. Smith*
BY *Arnold & Roylance*
ATTORNEYS Dec. 6, 1966     W. A. PETRIE ETAL     3,289,626
CHAIN STOPPERS Filed Aug. 19, 1965     2 Sheets-Sheet 2

INVENTORS
Warren A. Petrie
George R. Smith
BY Arnold & Roylance
ATTORNEYS

United States Patent Office 3,289,626
Patented Dec. 6, 1966

3,289,626
CHAIN STOPPERS
Warren A. Petrie, New Orleans, and George R. Smith, Covington, La. (both c/o J. Ray McDermott & Co., Inc., Saratoga Bldg., New Orleans, La.)
Filed Aug. 19, 1965, Ser. No. 480,979
8 Claims. (Cl. 114—200)

This invention relates to devices for releasably connecting a chain to an associated structure in such fashion that the point of the connection can be adjusted relative to the length of the chain. Though the invention can be employed in connection with chains used to serve various purposes, it finds particular use in connecting an anchor chain to a buoy.

When chains are used to anchor large buoys and the like, it is desirable that the connection between the chain and the buoy be accomplished in a manner such that the point along the length of the chain at which the connection is made can be adjusted simply by pulling upwardly on the chain and then releasing the chain, such adjustment serving, for example, to tension the chain. Though various devices have been proposed in the past for accomplishing this result, none has been truly satisfactory for heavy duty applications in which the buoy or the like is free to move in a fashion which changes the direction of the run of the chain.

It is accordingly a general object of this invention to provide a device, in the nature of a combined chain stopper and guide, which satisfies all of the requirements presented by such heavy duty applications as are encountered in anchoring large buoys and the like.

Another object is to provide a combined chain stopper and guide which has at least one degree of freedom of pivotal movement to allow the device to align itself automatically with the changing direction of the chain.

A further object is to devise a self-aligning chain stopper which embraces and constrains the chain over a significant portion of the length of the chain, e.g., substantially more than the length of one of the links, in a manner which assures adequate alignment of the chain stopper with the chain.

Yet another object is to provide a chain stopper which can be manufactured at relatively low cost, yet has the necessary great strength for heavy duty applications.

Stated broadly, chain stoppers in accordance with the invention comprise a rigid body having an axial, chain-accommodating through passage of generally X-shaped transverse cross section, the wall of the passage defining two pairs of opposed, straight, axially extending grooves with the grooves of each pair opening toward each other and lying in a common plane, the plane occupied by one pair of grooves intersecting the plane occupied by the other pair along a line coincident with the central axis of the passage. At least one pawl is mounted on the body for pivotal movement between a retracted position and a chain-engaging position, in which latter position the pawl projects transversely into the passage. Means are provided to support the body for pivotal movement about at least one axis transverse to the passage.

In order that the manner in which the foregoing and other objects are achieved in accordance with the invention can be understood in detail, one particularly advantageous embodiment thereof will be described with reference to the accompanying drawings, which form a part of this specification, and wherein:

FIG. 1 is a view, partly in longitudinal section and partly in side elevation, of a chain stopper in accordance with the invention;

FIG. 2 is a longitudinal sectional view taken on line 2—2, FIG. 1, with some parts shown in elevation;

FIG. 3 is a top plan view of the chain stopper, viewed as indicated by line 3—3, FIG. 1;

Figure 4:
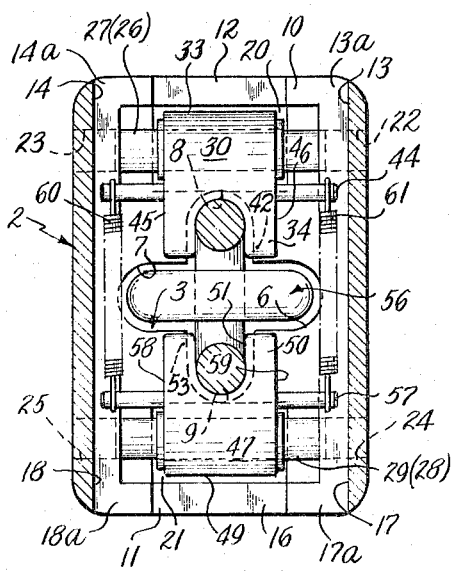
Figure 5:
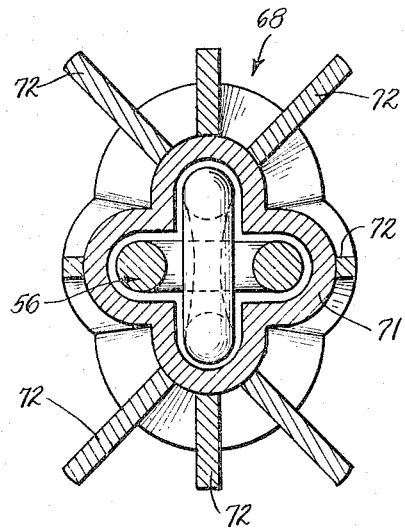
Figure 6:
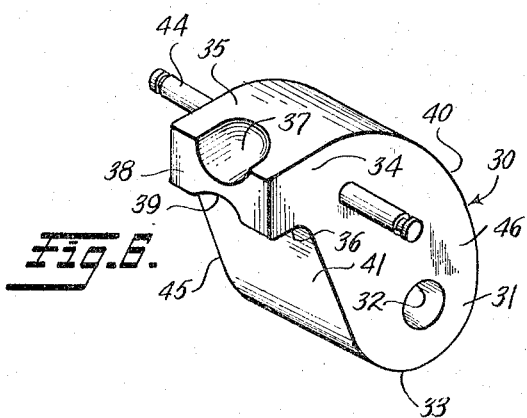

FIGS. 4 and 5 are transverse sectional views taken respectively on lines 4—4 and 5—5, FIG. 1; and FIG. 6 is a perspective view of one of the pawls employed in the chain stopper.

Turning now to the drawings in detail, the chain stopper 1 comprises an integral rigid metal body 2 having an axial through passage 3 and transverse end surfaces 4 and 5. Passage 3 is of generally X-shaped transverse cross section, the walls of the passage defining a first pair of opposed grooves 6, 7 and a second pair of opposed grooves 8, 9. Grooves 6–9 are straight, parallel and of U-shaped transverse cross section. Grooves 6 and 7 open toward each other and lie in a common plane which includes the central axis of passage 3. Grooves 8 and 9 open toward each other and lie in a common plane which is at right angles to the plane of grooves 6 and 7 and intersects that plane along a line coincident with the central axis of the passage 3.

Body 2 has two lateral, transversely aligned, pawl-accommodating openings 10 and 11. Opening 10 is defined by a bottom wall 12, side walls 13 and 14, and a top wall 15. Opening 11 is complementary to opening 10, being defined by bottom wall 16, side walls 17 and 18 and top wall 19. Bottom walls 12 and 16 lie in a common plane at right angles to the central axis of passage 3. As shown in FIG. 2, bottom wall 12 is provided with a straight groove 20 which extends at right angles to the central axis of passage 3, the wall of groove 20 being somewhat less than one-half or a right cylindrical surface. The bottom wall 16 of opening 11 is similarly provided with a groove 21. Grooves 20 and 21 are parallel to each other and to the plane occupied by grooves 6 and 7, and are spaced equally from that plane.

Side walls 13 and 14 of opening 10 are provided with coaxially aligned bores 22 and 23, the common axis of bores 22 and 23 being coincident with the axis of groove 20. Side walls 17 and 18 of opening 11 are provided with coaxially aligned bores 24 and 25, the common axis of these bores being coincident with the axis of groove 21. A shaft 26 has its end portions fixed respectively in bores 22 and 23, the intermediate portion of the shaft being of reduced diameter to accommodate a bearing sleeve 27 having an outer diameter such that the combination of the shaft and sleeve can be inserted into place via one of the bores 22, 23. A second shaft 28, carrying a bearing sleeve 29, has its end portions secured respectively in bores 24 and 25.

Pivotally carried by shaft 26 and sleeve 27 is a pawl 30, shown in detail in FIG. 6. Pawl 30 includes a mounted end portion 31 provided with a cylindrical through bore 32 of a diameter such that the wall of the bore slidably embraces sleeve 27. The periphery of end portion 31 is defined by a surface 33 which is part of a cylindrical surface of smaller radius than is groove 20, the axis of curvature of surface 33 being coincident with the axis of shaft 26, so that end portion 31 of the pawl is accommodated by groove 20 with freedom for pivotal movement of the pawl. Pawl 30 also includes a chain-engaging tip portion 34 of rectangular transverse cross section, tip portion 34 being elongated so as to present flat parallel top and bottom faces 35 and 36, respectively, each extending tangentially to a circle centered on the axis of bore 32. The pawl is so arranged that its tip portion 34 projects toward passage 3 when the tip portion is disposed above shaft 26. A notch 37 is provided in the top face 35 of pawl 30, the notch 37 having a U-shaped transverse cross section and opening in the direction in which surface 35 faces. Notch 37 also opens through the end face 38 of tip portion 34. A similar notch 39 is provided in bottom face 36.

The portion of body 2 in which groove 8 is formed presents two upwardly directed flat transverse face portions 42, FIG. 4, so disposed as to be engaged by the bottom face 36 of pawl 30 when the pawl is in the chain-stopping position seen in FIG. 2.

Between portion 31 and tip 34, pawl 30 is defined by an outer curved face 40 and an inner flat face 41, the latter extending tangentially with respect to surface 33.

Adjacent tip portion 34, pawl 30 is provided with a transverse bore in which is rigidly secured a rod 44, the rod being substantially longer than the distance between the flat parallel side surfaces 45 and 46 of the pawl. Rod 44 is centered on the width of the pawl so that the end portions of the rod project equally from surfaces 45 and 46, respectively.

The combination of shaft 28 and sleeve 29 supports a pawl 47 which is in all respects identical to pawl 30. Thus, pawl 47 includes mounted end portion 48, a bore accommodating shaft 28 and sleeve 29, cylindrical surface 49, and the chain-engaging tip portion 50 provided with chain-engaging upper notch 51 and lower notch 52. The portion of body 2 in which groove 9 is formed presents two upwardly directed flat transverse face portions 53 to engage the bottom face of tip portions 50 and stop the pawl in a position in which the tip portion 50 projects toward passage 3 at right angles to the axis thereof with notch 51 aligned with notch 37, the two notches thus coacting to provide a seat for the lower end of one of the links 55 of the conventional stud chain 56. The pawl 47 is equipped with a rod 57 secured with its end portions projecting equally from the respective side surfaces 58 and 59 of the pawl.

Helical tension springs 60 and 61 are connected between the corresponding ends of rods 44 and 57, as best seen in FIG. 4, serving to bias the pawls 30 and 47 toward each other into the chain-engaging positions seen in FIG. 2. Accordingly, assuming the chain 56 to be run through passage 3, a downward strain on the chain relative to body 2 serves to cause one of the links of the chain to seat in notches 37 and 51 so that the chain is held by the pawls against downward movement through the passage. If, on the other hand, the chain is pulled upwardly through passage 3, the first of the links which approaches the pawls via grooves 6 and 7 engages in notches 39 and 52 and further upward movement of the chain through the passage causes that link to cam the pawls outwardly, against the biasing action of springs 60 and 61, so that the link can pass the pawls, this action being repeated for each link passing upwardly via grooves 6 and 7. Accordingly, though the pawls are biased to accurately determined chain-engaging positions, they are free to be cammed to inactive positions, in which they are withdrawn from passage 3, to allow upward movement of the chain through body 2.

To assure that movement of the pawls outwardly away from passage 3 will not be impeded by any part of body 2, openings 10 and 11 are of such width as to freely accommodate the main bodies of the pawls, and are provided with opposed side notches or enlargements 13a, 14a, 17a and 18a to allow free swinging movement of the respective end portions of rods 44 and 57.

An upper end structure 62 is secured to the upper transverse end face 4 of body 2, as by cap screws 63, and includes a flat transverse plate 64, an upwardly and outwardly flaring tubular portion 65, and axially extending flat stiffening ribs 66. Plate 64 has the same plan shape as does end face 4 and includes a centrally disposed generally X-shaped opening 67 which is of such shape and dimensions and so located as to constitute a continuation of passage 3. The inner wall of tubular portion 65 has, throughout its entire length, a transverse cross section corresponding to that of passage 3, save that the cross section of the inner wall of portion 65 is of the same size as that of passage 3 only at the lower end of portion 65 and flares outwardly and upwardly in straight line fashion.

A lower end structure 68 is secured to the lower transverse end face 5 of body 2, as by cap screws 69, and comprises a flat transverse plate 70, a downwardly extending tubular portion 71, and flat, axially extending stiffening ribs 72. Plate 70 has the same plan shape as does face 5 and includes a central opening 73 which is of the same generally X-shape configuration as the transverse cross section of passage 3, so that opening 73 constitutes an exact continuation of passage 3. At its upper end, the inner wall of tubular portion 71 constitutes a straight extension of the wall of passage 3. From a point spaced substantially below body 2, the inner wall of portion 71 flares downwardly and outwardly, though still retaining the same cross-sectional configuration.

In an area spaced above the common transverse plane occupied by shafts 26 and 28, body 2 is provided with two integrally formed oppositely projecting stub shafts 74 and 75. Shafts 74 and 75 extend coaxially and at right angles to the central axis of passage 3. The common axis of stub shafts 74 and 75 also extends at right angles to the plane of grooves 6 and 7 and, therefore, parallel to the plane of grooves 8 and 9. As seen from FIG. 3, the axis of shafts 74 and 75 intersects the axis of passage 3. Shaft 74 carries a bearing sleeve 76, and shaft 75 is similarly provided with a sleeve 77. Each stub shaft is journalled in a trunnion bearing 78, 79, respectively, it being understood that the trunnion bearings are suitably mounted on the buoy or other device (not shown) with which the chain stopper 1 is employed. The combination of stub shafts 74, 75 and bearings 78, 79 serves to allow the chain stopper one degree of freedom of movement in order to adjust to the particular disposition of the chain.

End structures 62 and 68 serve as means for guiding the links of chain 56 into the respective opposed pairs of grooves 6, 7 and 8, 9, even though the chain is twisted or extends away from the chain stopper at an angle which cannot be eliminated by the pivotal movement afforded by shafts 74, 75 and bearings 78, 79.

It is to be noted that the grooves 6, 7 and 8, 9 of passage 3, and the matching grooves defined by the upper portion of tubular portion 71 of the lower end structure 68, positively guide and constrain the chain over a distance which is long as compared to the dimensions of tips 34 and 50 of the pawls, so as to assure proper positional relationship between the pawls and the chain links. In this embodiment, which is specially adapted for use in connection with anchor chains and the like, the pawls 30 and 47 are located wholly below the pivotal axis defined by shafts 74 and 75, when the pawls are in the chain-engaging positions shown in FIG. 2. This relationship assures that, with the pawls engaging the chain and with a downward strain applied to the chain, the chain stopper will be pivoted to adapt to the direction in which the chain runs downwardly from the chain stopper.

The illustrated embodiment of the invention is particularly adapted for the low cost manufacture of a device of great strength and durability, the body 2 being an integral piece and the end structures being fabricated, as by welding, from heavy metal stock.

Though one particularly advantageous embodiment of the invention has been chosen for illustrative purposes, it will be understood by those skilled in the art that various changes and modifications can be made therein without departing from the scope of the invention as defined in the appended claims.

What is claimed is:

1. In a device of the type described, the combination of a rigid body having a passage extending axially therethrough, said body having a normal operative position in which said passage extends upwardly, said passage having a generally X-shaped transverse cross section, the wall of said passage defining two pairs of opposed elongated straight parallel grooves with the grooves of each pair opening toward each other and lying in a common plane, the plane occupied by one of said pairs of grooves intersecting the plane occupied by the other of said pairs of grooves along a line coincident with the central axis of said passage;

a pawl mounted on said body for pivotal movement about an axis which is at least substantially at right angles to one of said planes,
    said pawl being disposed to move between a retracted position, in which the pawl is withdrawn from said passage to allow movement of a chain therethrough, and a chain-engaging position, in which said pawl projects into said passage,
    said pawl being biased toward said chain-engaging position; and support means operatively connected to said body to support the same for pivotal movement about at least one axis transverse to said passage.

2. A device according to claim 1, wherein
said support means comprises a pair of aligned shafts carried by said body, and a pair of bearing members, each of said shafts being journalled in a different one of said bearing members.

3. A device according to claim 2, wherein
said pivotal axis of said pawl extends at right angles to said shafts.

4. A device according to claim 1 and further comprising
a second pawl mounted on said body for pivotal movement about an axis parallel to the axis of pivotal movement of said first-mentioned pawl,
    said pawls being opposed and spaced from each other across said passage; and tension spring means interconnecting said pawls and biasing each of said pawls to its chain-engaging position.

5. A device according to claim 1 wherein
said body has a transverse top surface and a transverse bottom surface,
the device further comprising
upper and lower end structures secured rigidly to said top and bottom surfaces,
    said end structures each having a through passage constituting an outwardly flaring end portion of said passage of said body.

6. A device according to claim 1 and further comprising
a second pawl mounted on said body for pivotal movement about an axis parallel to the axis of pivotal movement of said first-mentioned pawl,
    said pawls being opposed and spaced from each other across said passage,
    each of said pawls having a chain-engaging end portion spaced from the pivotal axis of the pawl and adapted to extend generally transversely of said passage when said pawls are in their chain-engaging positions,
    each of said chain-engaging end portions having a notch extending lengthwise of the chain-engaging end portions and opening through the tip thereof, said notches being aligned transversely of said passage, when said pawls are in their chain-engaging positions, and then cooperating to provide a seat for an end of one link of the chain, said chain-engaging end portions being spaced apart, when said pawls are in their chain-engaging positions, by a distance adequate to accommodate the thickness of a link of the chain, said passage being effective to guide the chain positively to bring one of the links of the chain into engagement in said notches when said pawls are in their chain-engaging positions.

7. A device according to claim 1, wherein
said body is provided with transversely aligned pawl-accommodating openings communicating with said passage,
    each of said openings having a bottom wall, said bottom walls lying in a common plane at right angles to the axis of said passage,
    each of said openings having side walls spaced apart in a direction parallel to the plane of one opposed pair of the grooves of said passage, the side walls of each of said openings being provided with shaft-accommodating bores, the device further comprising
two shafts each accommodated by the bores in the side walls of a different one of said openings,
    said pawls each being carried by a different one of said shafts, and cooperating stop means on said pawls and said bottom walls to stop said pawls in their chain-engaging positions.

8. A device according to claim 1 and further comprising
a second pawl mounted on said body for pivotal movement about an axis parallel to the axis of pivotal movement of said first-mentioned pawl,
    said pawls being opposed to each other and spaced apart across said passage,
    each of said pawls having a chain-engaging tip portion provided with a notch, said pawls and said body having cooperating stop means operative to position said pawls with said tip portions in transverse alignment across said passage and said notches aligned to constitute a seat for one end of the link of a chain.

References Cited by the Examiner
UNITED STATES PATENTS
13,760    11/1855    Perley _____ 114—200

FOREIGN PATENTS
137,857    10/1952    Sweden.

MILTON BUCHLER, *Primary Examiner.*
A. H. FARRELL, *Assistant Examiner.*

UNITED STATES PATENT OFFICE
CERTIFICATE OF CORRECTION

Patent No. 3,289,626            December 6, 1966

Warren A. Petrie et al.

It is hereby certified that error appears in the above numbered patent requiring correction and that the said Letters Patent should read as corrected below.

In the heading to the printed specification, lines 4 and 5, for "(both c/o J. Ray McDermott & Co., Inc., Saratoga Bldg. New Orleans, La.)" read -- assignors to J. Ray McDermott & Co. Inc., New Orleans, La., a corporation of Delaware --; column 2 line 31, for "or" read -- of --.

Signed and sealed this 19th day of September 1967.

(SEAL)
Attest:

ERNEST W. SWIDER
Attesting Officer

EDWARD J. BRENNER
Commissioner of Patents